United States Patent
Kuntagod et al.

(10) Patent No.: US 9,294,866 B2
(45) Date of Patent: Mar. 22, 2016

(54) METHOD AND SYSTEM FOR RESOURCE OPTIMIZED, COARSE AND FINE GRAINED LOCATION TRACKING FOR PLANNED JOURNEY

(71) Applicant: Accenture Global Services Limited, Dublin (IE)

(72) Inventors: Nataraj Kuntagod, Karnataka (IN); Sanjoy Paul, Karnataka (IN); Senthil Kumaresan, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 402 days.

(21) Appl. No.: 13/782,151

(22) Filed: Mar. 1, 2013

(65) Prior Publication Data

US 2014/0248909 A1   Sep. 4, 2014

(30) Foreign Application Priority Data

Jan. 16, 2013   (IN) .............................. 215/CHE/2013

(51) Int. Cl.
*H04W 24/00* (2009.01)
*H04W 4/00* (2009.01)
*H04W 4/02* (2009.01)

(52) U.S. Cl.
CPC .............. *H04W 4/001* (2013.01); *H04W 4/021* (2013.01); *H04W 4/028* (2013.01)

(58) Field of Classification Search
CPC ...... H04W 4/001; H04W 4/021; H04W 4/028
See application file for complete search history.

(56) References Cited

U.S. PATENT DOCUMENTS

| | | | |
|---|---|---|---|
| 2005/0253752 A1 | 11/2005 | Lalik et al. | |
| 2005/0288852 A1* | 12/2005 | Kelly | 701/204 |
| 2008/0103686 A1 | 5/2008 | Alberth et al. | |
| 2010/0250118 A1 | 9/2010 | Bansal et al. | |
| 2012/0022782 A1* | 1/2012 | Laube | G01C 21/3679 701/410 |
| 2012/0150424 A1* | 6/2012 | Chavez et al. | 701/118 |
| 2012/0161958 A1* | 6/2012 | Turon et al. | 340/539.3 |

FOREIGN PATENT DOCUMENTS

EP   2282225 A1   2/2011

OTHER PUBLICATIONS

European Patent Office, Extended European Search Report, Apr. 9, 2014.

* cited by examiner

*Primary Examiner* — Pakee Fang
(74) *Attorney, Agent, or Firm* — Harrity & Harrity, LLP

(57) ABSTRACT

Methods and systems for resource optimized, coarse and fine grained location tracking for planned journey are disclosed. A method for tracking a mobile device with respect to a point of interest (POI) using a mobile location tracker includes a conserve mode in which the mobile location tracker is turned off. The conserve mode comprises determining, by an analyzer module, whether to assess an estimated time to arrive (ETA) at the POI. If determined to assess the ETA, the conserve mode comprises performing an ETA assess operation comprising receiving the ETA; and if the ETA is not greater than a threshold time, switching from the conserve mode to an active mode, wherein in the active mode the mobile location tracker is turned on. It is determined to assess the ETA if a timer measurement is not less than the reassess time or if a trigger to reassess is received.

20 Claims, 9 Drawing Sheets

METHOD AND SYSTEM FOR RESOURCE OPTIMIZED, COARSE AND FINE GRAINED LOCATION TRACKING FOR PLANNED JOURNEY

CROSS-REFERENCE TO RELATED APPLICATIONS

This application claims the benefit of Indian Application No. 215/CHE/2013, filed Jan. 16, 2013, which is herein incorporated by reference in its entirety.

TECHNICAL FIELD

The present disclosure relates generally to methods and systems for location tracking and in particular for location tracking using mobile devices.

BACKGROUND

Many jobs require an employee to visit specific locations, each called a point of interest (POI), and perform specific activities in those locations. Some salespersons, for example, are required to visit specific potential customers to present their merchandise. Some social workers, such as health or education workers, are required to visit specific rural or urban areas and provide residents with health or education services. Or some wireless cell tower inspectors are required to inspect a group of cell towers on a regular basis and check, for example, the fuel levels in those towers. The POIs can be, for example, the locations that are assigned to the employee, such as the locations of the potential customers, rural or urban areas, or cell towers in the above examples.

In many of these or similar activities, the employer needs to track the employee's location, e.g., to ensure the employee's compliance with the duties. The employer, for example, may need to verify that the employee visits the assigned POIs and spends a reasonable amount of time in each POI. There is thus a need for a reliable location tracker that can be used in a variety of situations.

SUMMARY

According to some embodiments a method for tracking a mobile device with respect to a point of interest (POI) using a mobile location tracker includes a conserve mode in which the mobile location tracker is turned off, and wherein the conserve mode comprises determining, by an analyzer module, whether to assess an estimated time to arrive (ETA) at the POI; if the analyzer module determines to assess the ETA, performing an ETA assess operation, wherein the ETA assess operation comprises receiving, by the analyzer module, the ETA; and if the ETA is not greater than a threshold time, switching from the conserve mode to an active mode, wherein in the active mode the mobile location tracker is turned on.

In some embodiments the conserve mode further comprises storing, by the analyzer module, a reassess time; and determining, by the analyzer module, to assess the ETA if a timer measurement is not less than the reassess time, wherein the timer measurement measures a time elapsed since a last ETA assess operation or a last switch to the conserve mode.

In some embodiments the reassess time is calculated based on the ETA, a speed of the mobile location tracker, a distance between the mobile location tracker and the POI, a prior history, or a context. In some embodiments, if the ETA is greater than the threshold time, the conserve mode further comprises recalculating, by the analyzer module, the reassess time; restarting the timer measurement; and setting the mobile location tracker to remain in the conserve mode. In some embodiments the reassess time is a fraction of the ETA.

In some embodiments the conserve mode further comprises receiving, by the analyzer module, a trigger to reassess; and upon receiving the trigger to reassess, performing the ETA assess operation. In some embodiments the trigger to reassess indicates a change of status of the mobile location tracker and is transmitted by a sensor module including an accelerometer, a speedometer, a clock, or a proximity sensor.

In some embodiments the conserve mode further comprises, if the ETA is greater than the threshold time, setting the mobile location tracker to remain in the conserve mode. In some embodiments the active mode comprises determining, by the mobile location tracker, a location of the mobile location tracker; and if the location is outside an active zone, switching from the active mode to the conserve mode. In some embodiments the active mode further comprises, if the location is in the active zone, checking, by the analyzer module, whether an aggressive conservation trigger is received; if the aggressive conservation trigger is received, issuing a warning indicating that the aggressive conservation trigger is received, and switching to the conserve mode.

In some embodiments the method further comprises a startup mode, the startup mode comprising determining, by the analyzer module, whether the mobile location tracker will be utilized in a period of time; if the mobile location tracker will not be utilized in the period of time, setting the mobile location tracker to hibernate in the period of time; if the mobile location tracker will be utilized in the period of time, receiving, by the analyzer module, the ETA; if the ETA is greater than the threshold time, switching to the conserve mode; and if the ETA is not greater than the threshold time, switching to the active mode.

In some embodiments the ETA is calculated by an ETA module based on a speed of the mobile location tracker, a distance between the mobile location tracker and the POI, a route to the POI, a prior history, or a context.

In some embodiments a system for tracking a mobile device with respect to a point of interest (POI) comprises a mobile location tracker configured to track a location of the mobile device; an ETA estimator for estimating an estimated time to arrive (ETA) at the POI; an analyzer module configured to operate in a conserve mode, in which the mobile location tracker is turned off, wherein the conserve mode comprises: determining whether to assess the ETA; if determined to assess the ETA, performing an ETA assess operation, wherein the ETA assess operation comprises: receiving, from the ETA estimator, the ETA; and if the ETA is not greater than a threshold time, switching from the conserve mode to an active mode, wherein in the active mode the mobile location tracker is turned on.

In some embodiments the system further comprises a timer configured to measure time elapsed since last a last ETA assess operation or a last switch to the conserve mode, and wherein the analyzer module is further configured to: store a reassess time; perform the ETA assess operation if the timer measurement is not less than the reassess time. In some embodiments the analyzer module is configured to calculate the reassess time based on the ETA, a speed of the mobile location tracker, a distance between the mobile location tracker and the POI, a prior history, or a context.

In some embodiments the system further comprises a sensor module configured to transmit a trigger to reassess indicating a change of status of the mobile location tracker, and wherein the analyzer module is configured to: receive the trigger to reassess; upon receiving the trigger to reassess, perform the ETA assess operation. In some embodiments the sensor module includes an accelerometer, a speedometer, a clock, or a proximity sensor.

In some embodiments a non-transitory computer readable medium stores a computer program, wherein the computer program, when executed by one or more processors, causes the one or more processors to perform a method for operating a mobile location tracker for tracking a mobile device with respect to a point of interest (POI), wherein the method includes a conserve mode in which the mobile location tracker is turned off, and wherein the conserve mode comprises determining whether to assess an estimated time to arrive (ETA) at the POI; if determined to assess the ETA, performing an ETA assess operation, wherein the ETA assess operation comprises: receiving the ETA; and if the ETA is not greater than a threshold time, switching from the conserve mode to an active mode, wherein in the active mode the mobile location tracker is turned on.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Figure 1:
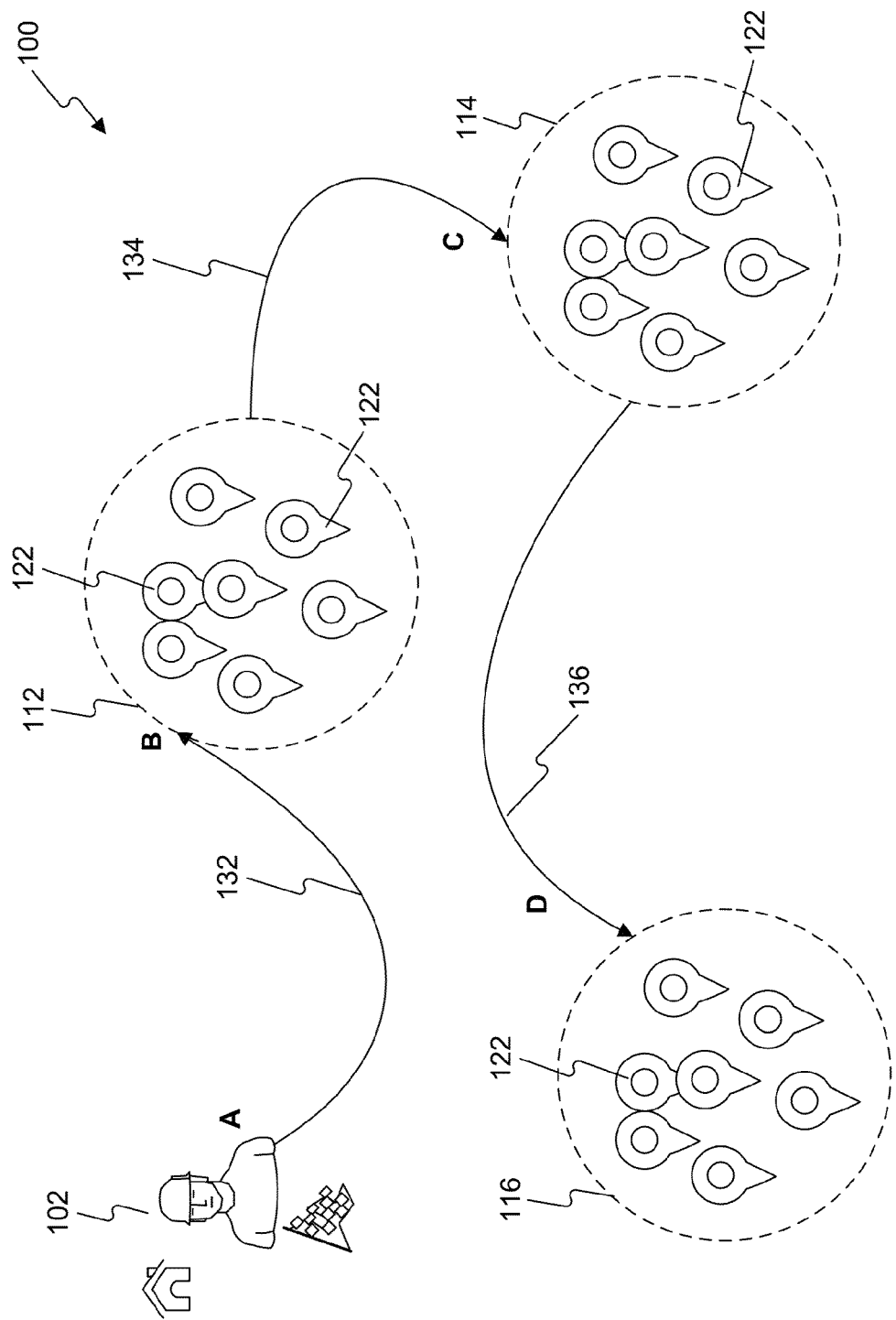
FIGS. 1 and 2 show schematics of an employee's route according to some embodiments.

The following detailed description refers to the accompanying drawings. Wherever possible, the same reference numbers are used in the drawings and the description to refer to the same or similar parts. Also, similarly-named elements may perform similar functions and may be similarly designed, unless specified otherwise. While several exemplary embodiments and features are described here, modifications, adaptations, and other implementations may be possible, without departing from the spirit and scope of the invention. Accordingly, unless stated otherwise, the descriptions relate to one or more embodiments and should not be construed to limit the invention as a whole. Instead, the proper scope of the invention is defined by the appended claims.

In some embodiments, an employer tracks an employee's location using a location tracker that is carried by the employee. In some embodiments, the location tracker uses a fine tracking system such as a Global Positioning System (GPS). The location tracker transmits messages to a receiver that the employer can access. Each message indicates the location of the location tracker at a given time. Using these messages, the employer can determine whether the employee is at a desired POI at a specific time, whether the employee spends a desired amount of time at that POI, etc.

FIG. 1 shows a schematic 100 of an employee's route according to some embodiments. Schematic 100 shows an employee 102 who is assigned to visit clusters of POI 122 located in regions 112, 114, and 116. Further, in the embodiment of FIG. 1, to reach clusters 112, 114, and 116, the employee takes the routes 132, 134, and 136, respectively.

In some embodiments, each cluster is a region in which a group of one or more POIs 122 are located. In some embodiments, the employer needs to accurately track the employee while the employee is within each of the clusters 112, 114, and 116. The employer does not need to accurately track the employee while the employee is outside the clusters and on, for example, routes 132, 134, and 136.

Some embodiments use a mobile location tracker to track the location of employee 102. A mobile location tracker may be a device that is attached to the employee's vehicle, carried by the employee, etc. In some embodiments, the mobile location tracker is a handheld device carried by the employee. In some embodiments, the handheld device is a mobile device, such as a smart phone, used by the employee. In some embodiments, the mobile device is equipped with a tracking application that performs the location tracking. The mobile location tracker is a mobile device equipped with a tracking application such as a GPS application, a cargo tag, or a GPS device.

In some embodiments, the mobile device can detect its location and transmit that information, through wireless communications, to a receiver accessed by the employer. In some embodiments, the receiver is a device that is controlled by the employer and is equipped with a receiver application. The receiver receives the transmitted information from the employee's mobile device and accordingly determines the location of the employee at the time of transmission.

Advances in mobile device technology, such as hand held devices, have enabled the mobile devices to be used as tracking devices as well. Smart phones, for example, not only use wireless communication, but also execute GPS based tracking. Many situations necessitate use of readily available devices, such as smart phones, for tracking the employer. Such use may be convenient and less costly, for example, as it does not require providing a separate tracking device.

Thus, using a multi-function mobile device, such as a smart phone, eliminates the cost of providing an additional device for location tracking. Such use, however, may also introduce challenges in resource management. In some embodiments, the employee's mobile device performs multiple functionalities. In some embodiments, the mobile device is a handheld device that, in addition to location tracking, executes other functions that can include telephonic communications, audio or video recording, scheduling, or email exchanges. In some embodiments, the mobile device has some limited resources that are consumed by each of these activities. The limited resources may include limited communication bands, wireless usage time, or battery capacity.

In some embodiments, the employee needs to, for example, conserve the limited battery capacity of the mobile device for the duration of the activities. In some embodiments, the employee may visit multiple POIs during a period, such as a day, without having access to electrical outlets or the time to recharge the battery of the device. In some embodiments, the POIs are located in areas that have limited electricity resources.

In some handheld devices, the resources are used whenever they are requested by different applications. In these devices, a warning related to a resource may appear, e.g., when the battery charge level reaches a low threshold amount. Further, the device shuts down when the resource approaches zero. Such usage regime, however, may at times consume a resource for an unnecessary application and later render the device unavailable for running a necessary application. For example, before reaching a POI, an employee's handheld device may unnecessarily track the location using the GPS, thus consuming the battery charge quickly. Upon reaching the POI, on the other hand, the device may be so low in battery charge that it cannot run the GPS to send accurate tracking information to the employer's receiver. Some embodiments address these problems by implementing methods and systems for efficient usage of the resources by the tracking system.

Figure 2:
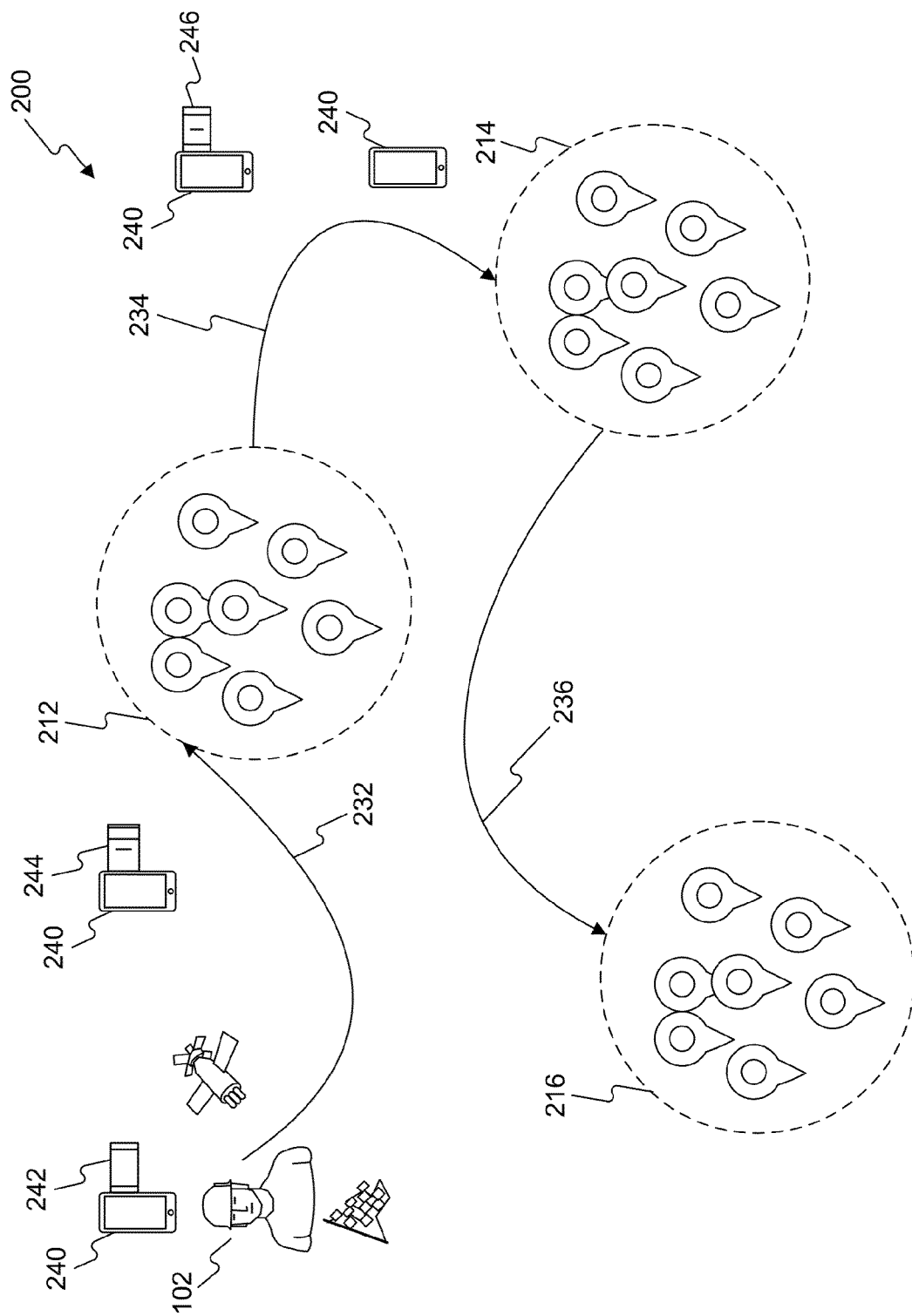

FIG. 2 shows a schematic 200 of an employee 202, who travels to clusters 212, 214, and 216, through routes 232, 234, and 236, respectively. In schematic 200, a handheld device 240 is used to accurately track the location of employee 202 throughout the trip. In some embodiments, handheld device 240 utilizes a GPS application to track the location of employee 202. At the start of route 232, the battery of handheld device 240 is in a fully charged state 242. Throughout route 232, GPS tracking of handheld device 240 accurately keeps track of device 240, and thus consumes some of the charge in the battery of device 240.

Upon reaching cluster 212 at the end of route 232, the battery of device 240 is in a partially charged state 244. Handheld device 240 is thus able to accurately track the location of employee 202 in cluster 212.

Upon leaving cluster 212, along route 234, GPS tracking of handheld device 240 continues the accurate tracking of device 240, thus consuming the battery of device 240. As a result, somewhere in the middle of route 234, the battery of device 240 reaches a fully discharged state 246.

After its battery is fully discharged, handheld device 240 cannot continue running the GPS tracking application. Thus, handheld device 210 cannot track the location of employee 202, when the employee reaches clusters 214 or 216. Therefore, using an accurate tracking method, such as GPS tracking, may result in a quick discharge of the handheld's resources and thus make the accurate tracking unavailable in some of the POIs.

Some embodiments utilize multiple tracking technologies with varying resource demands. Some location tracking technologies include GPS tracking, tracking via cell towers used in a wireless communication network, or AGPS. Different location tracking technologies provide different accuracies. The accuracy of cell tower tracking, for example, depends on the distance between cell towers, and varies among different areas. In general, cell tower tracking is less accurate than GPS tracking. Thus, in some embodiments, less accurate technologies are used as coarse grained tracking systems while the more accurate technologies are used as fine grained systems. In some embodiments, the tracking system requires an accurate tracking when the employee is near or at a POI and not when the employee is away from the POIs.

Different tracking technologies also differ in their resource demands. In some embodiments, more accurate fine grained systems use resources at higher rates than less accurate coarse grained systems. Tracking with GPS, for example, normally requires more battery power than tracking via the cell tower wireless communication system. Therefore, some embodiments use combinations of different tracking technologies at different times by balancing a tradeoff between accuracy and resource demand.

Figure 3A:
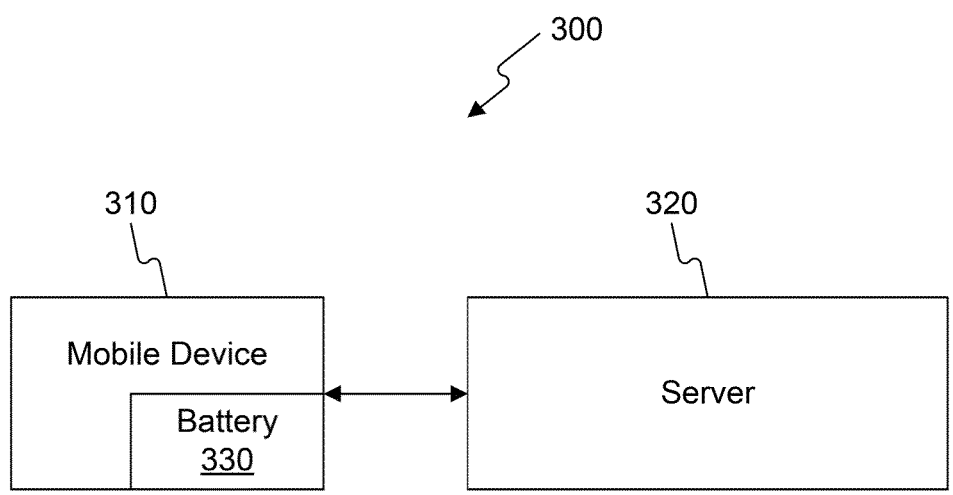
FIGS. 3A-3C show diagrams of tracking systems according to some embodiments.

FIG. 3A shows a block diagram of a tracking system 300 according to some embodiments. Tracking system 300 includes a mobile device 310 and a server 320. In some embodiments, mobile device 310 is carried by the employee and the tracking system 300 tracks the location of mobile device 310. Mobile device 310 is configured to execute both a fine grained tracking and a coarse grained tracking, with different resource demands. Mobile device 310 includes a handheld device, a smart phone, a mobile GPS tracker, a tracking tag, etc. In some embodiments, server 320 includes a computer system or another mobile device, which interacts with mobile terminal 310. In some embodiments, mobile device 310 includes a battery 330, used as a source of electricity for running different functions.

Figure 3B:
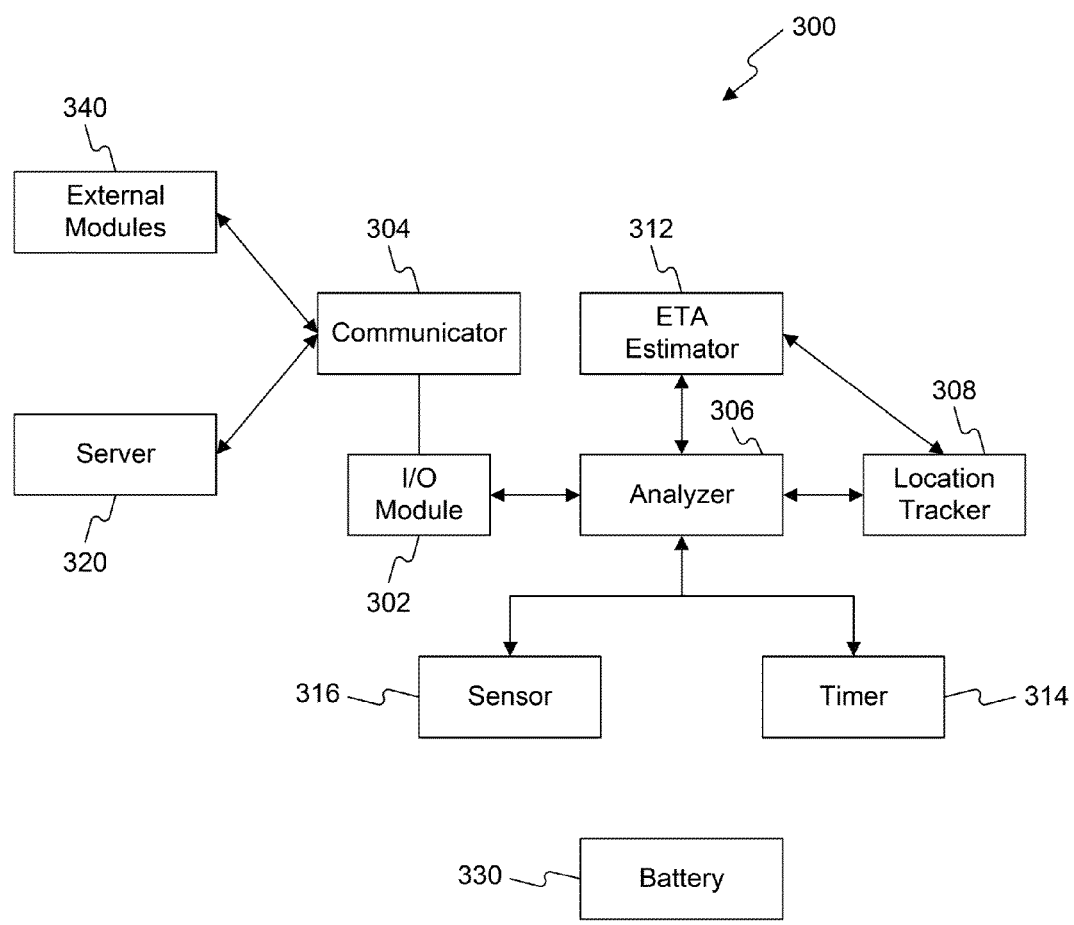

FIG. 3B shows another block diagram of a tracking system 300 according to some embodiments. Tracking system 300 includes an Input/Output (I/O) module 302, a communicator module 304, an analyzer module 306, a location tracker module 308, an ETA estimator module 312, a timer module 314, and a sensor module 316. In some embodiments, one or more of the above-listed modules are included in or executed by mobile device 310. Tracking system 300 also includes server 320.

As seen in FIG. 3B, in some embodiments, tracking system 300 further includes external modules 340. In some embodiments, external modules 340 are modules that are included in or executed by devices that are external to mobile device 310. In some embodiments, external modules 340 are not carried by the tracked employee. In some embodiments, external modules 340 are included in a cloud computing system or a cloud storage system, which communicate wirelessly with mobile device 310, server 320, or both. In some embodiments, external modules 340 includes one or more of other modules shown in FIG. 3B, such as analyzer module 306, ETA estimator module 312, or sensor module 316.

Analyzer module 306 is configured to perform operations that include analyzing information received from, or transmitting commands to, one or more of location tracker module 308, ETA estimator module 312, timer 314, or sensor module 316.

Location tracker module 308 determines the location of mobile device 310. In some embodiments, location tracker module 308 includes one or more fined grained location trackers and/or coarse grained location trackers. As detailed below, in some embodiments, location tracker module 308 transmits tracking information to analyzer module 306. Further, location tracker module 308 receives one or more commands, such as commands to hibernate or to wake up tracking devices from analyzer module 306.

The one or more coarse grained location trackers are configured to determine a rough estimate of the location of mobile device 310 or to estimate a distance from mobile device 310 to one or more POIs. In some embodiments, the one or more coarse grained location trackers include a wireless communication tracker using, for example, wireless cell towers and triangulation techniques.

In some embodiments, the one or more fine grained location trackers include an accurate location tracker such as a GPS device using GPS tracking technologies. In some embodiments, the one or more fine grained location trackers are used for accurate determination or tracking of the employees, as required by the employer. In some embodiments, the one or more fine grained location trackers are also used for estimating the distance from mobile device 310 to one or more POIs.

ETA estimator module 312 is configured to estimate an Estimated Time of Arrival (ETA) at one or more POIs. In some embodiments, ETA estimator module 312 uses information received from location tracker module 308 to estimate the ETA. In some embodiments, ETA estimator module 312 estimates the ETA based on a distance from the target POIs, that is, the POI or POI cluster to be visited next. In some embodiments, ETA estimator module 312 also uses the average or instant velocity of the mobile device or the vehicle carrying the mobile device or the employee.

The ETA estimator also considers factors such as the traffic speed or speed limits along the path to the target POIs, the weather conditions, a prior history of the same employee or other employees visiting the same target POI, etc. Based on the information, ETA estimator module 312 estimates a time of arrival or a duration of time before arriving at the target POIs. In some embodiments, ETA estimator module 312 receives the above information from one or more devices such as a speedometer, a coarse grained or fine grained tracking device, a map storage, a satellite monitoring the road conditions or traffic, a calendar, a weather sensor, etc. In some embodiments, ETA estimator module 312 also receives one or more of the above information from a history log or a rules database. In some embodiments, the ETA estimator receives such information from external modules or databases, such as modules and databases in a remote cloud server.

In some embodiments, timer module 314 is configured to measure time intervals. In some embodiments, analyzer module 306 uses timer module 314 to measure the time elapsed since the latest estimation of ETA, the latest hibernation of a tracking device, etc.

In some embodiments, sensor module 316 is configured to detect, and communicate to analyzer module 306, a change of state of mobile device 310. The change of state includes, for example, a change that can affect the ETA, such as a change of speed, speed limit, weather, road conditions, route, or transportation mode. In some embodiments, sensor device is an accelerometer or a speedometer, which detects a change of speed. In some embodiments, sensor 316 is configured to detect a change of weather or a change in road conditions.

I/O module 302 is configured to receive inputs and to provide outputs. In some embodiments, I/O module 302 is an interface for receiving and sending data to a user or to another system. In some embodiments, I/O module 302 includes an input interface and an output interface. The input interface is configured to receive data, such as commands, and the output interface is configured to output information such as tracking data. In some embodiments, I/O module 302 includes one or more of an internet interface, a wireless interface, a data reader, a mouse, a keyboard, a display, a speaker, a touch screen, or a printer.

Communicator module 304 is a module through which system 300 communicates with external systems. In some embodiments, communicator module 304 includes a wireless communication module through which mobile device 310 communicates with server 320 or with external modules 340.

In some embodiments, one or more of modules disclosed in this disclosure are implemented via one or more computer processors executing software programs for performing the functionality of the corresponding modules. In some embodiments, one or more of the disclosed modules are implemented via one or more hardware modules executing firmware for performing the functionality of the corresponding modules. In some embodiments, one or more of the disclosed modules include storage media for storing data used by the module, or software or firmware programs executed by the module. In some embodiments, one or more of the disclosed modules or disclosed storage media are internal or external to the disclosed systems. In some embodiments, one or more of the disclosed modules or storage media are implemented via a computing "cloud", to which the disclosed system connects via a communication system and accordingly uses the external module or storage medium. In some embodiments, the disclosed storage media for storing information include non-transitory computer-readable media, such as a CD-ROM, a computer storage, e.g., a hard disk, or a flash memory. Further, in some embodiments, one or more of the storage media are non-transitory computer-readable media that store information or software programs executed by various modules or implementing various methods or flow charts disclosed herein.

Figure 3C:
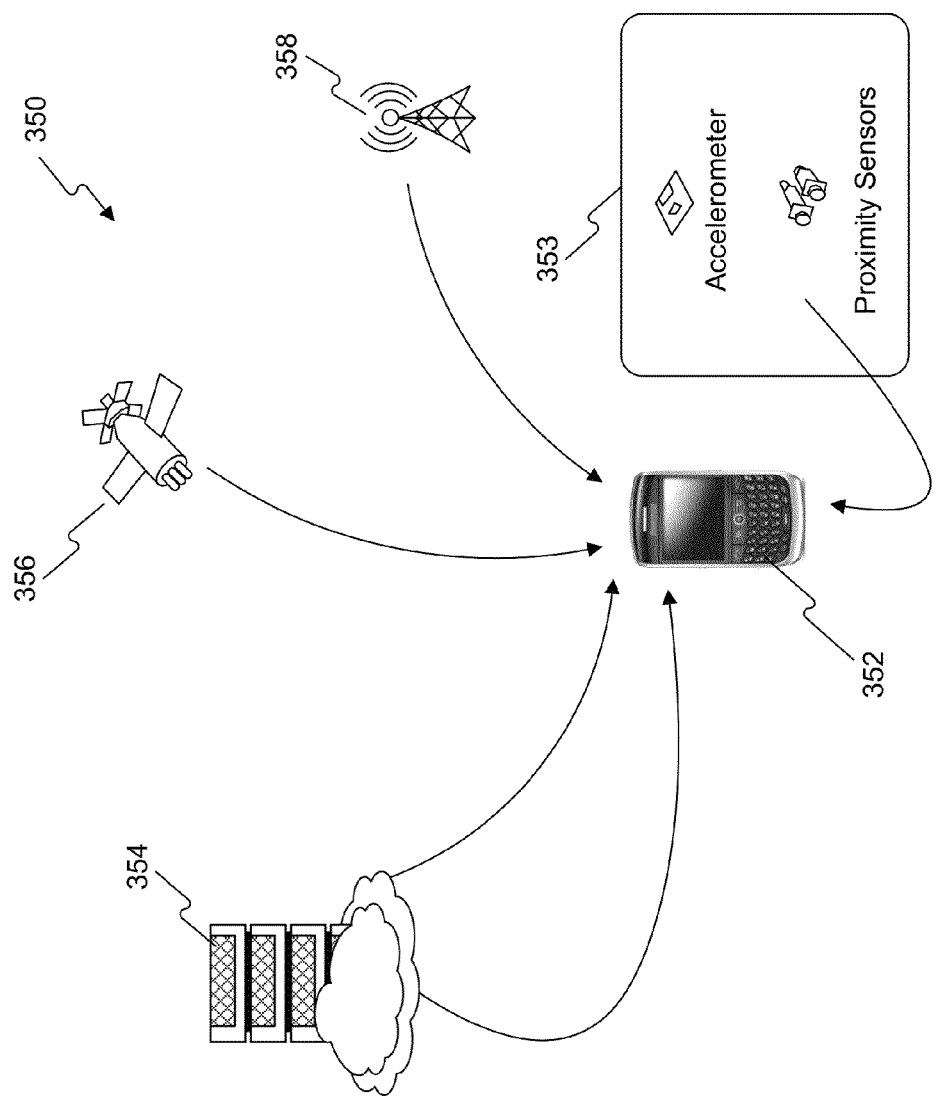

FIG. 3C shows various parts of a tracking system 350 according to some embodiments. Tracking system 350 includes mobile device 352, one or more sensors 353, ETA estimator 354, GPS tracking satellite 356, and wireless cell tower 358.

In some embodiments, mobile device 352 is associated with and tracks the location of the employee. In some embodiments, mobile device 352 is a handheld device, such as a smart phone, which executes the location tracking process and also communicates with other parts of tracking system 350.

In some embodiments, sensors 353 are configured to sense one or more status indicators and communicate the status indicators or their changes to mobile device 352. In some embodiments, one or more sensors 353 are installed in mobile device 352. In some embodiments, one or more of sensors 353 are external to mobile device 352 and communicate with mobile device 352 through a wireless connection. In some embodiments, sensors 353 include an accelerometer configured to detect the change of speed of mobile device 352. In some embodiments, sensors 353 include proximity sensor related to the employee and configured to detect whether mobile device 352 is or is not near the employee.

In some embodiments, ETA estimator 354 is configured to estimate the ETA. In some embodiments, ETA estimator 354 includes one or more processors configured to calculate the ETA. In some embodiments, ETA estimator 354 receives information such as fine grained or coarse grained location of mobile device 352, or the route to the next POIs, In some embodiments, ETA estimator uses the received information to calculate the ETA. In some embodiments, ETA estimator 354 is installed in mobile device 352. In some embodiments, ETA estimator 354 is external to mobile device 352 and communicates with mobile device 352 through a wireless connection.

In some embodiments, GPS tracking satellite 356 is part of a GPS tracking system that is in communication with a GPS module in mobile device 352. In some embodiments, tracking system 350 utilizes the GPS tracking system to perform a fine grained tracking of mobile device 352.

In some embodiments, cell tower 358 is part of a wireless communication system to which mobile device 352 connects. In some embodiments, tracking system 350 utilizes the wireless communication system to perform a coarse grained tracking of mobile device 352.

In some embodiments, the location tracking system executes the tracking by transitioning through different operational modes. In some embodiments, the operational modes include a startup mode, a conserve mode, and an active mode. In some embodiments, the tracking system starts with the startup mode when the mobile device is turned on or when starting each working period, e.g., each day.

In some embodiments, in the conserve mode, the mobile device minimizes the use of the fine grained tracking to conserve the resources of the mobile device. In some embodiments, the tracking system stays in the conserve mode while the mobile system is away from the POIs and the system does not require accurate tracking of the mobile device.

In some embodiments, in the active mode, the mobile device uses the fine grained tracking to accurately track the location of the mobile device. In some embodiments, the tracking system stays in the active mode while the mobile device is near one or more POIs, or near or in a POI cluster.

In some embodiments, the tracking system executes some algorithms to maximize the duration of the conserve mode while assuring that the system is in the active mode when a fine grained tracking is needed.

Figure 4:
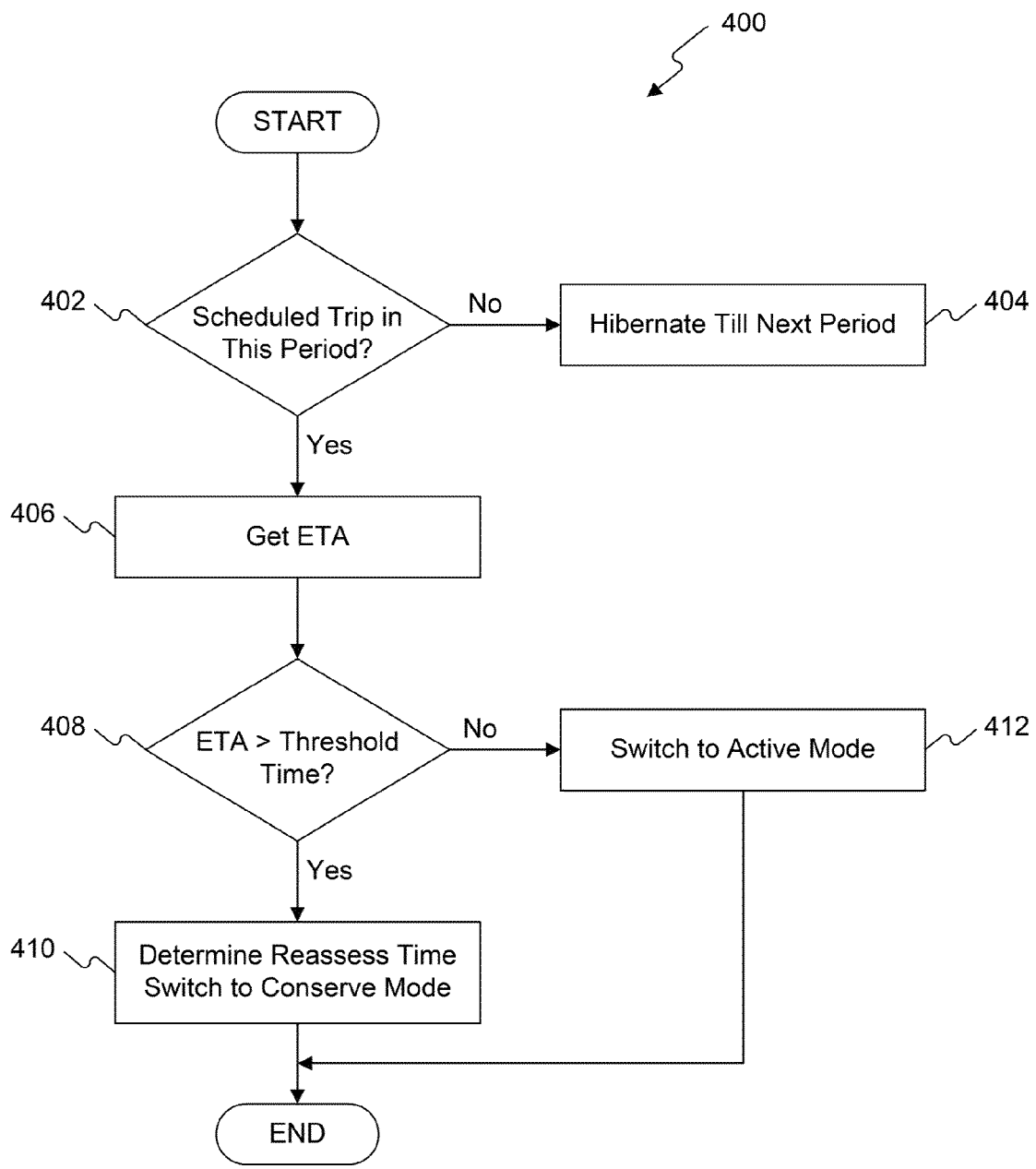
FIG. 4 shows a flowchart for the processes performed by a tracking system in a startup mode according to some embodiments.

FIG. 4 shows a flowchart 400 for a process performed by the tracking system in the startup mode according to some embodiments.

In decision block 402, the system checks whether the employee is scheduled for any trips in this period, e.g., this day, during which the system needs to track the employee. If no such trips are scheduled for the period (decision block 402: No), in block 404 the system hibernates until the start of the next period or until it receives a wake up command. In the embodiment of FIG. 4, while hibernating, the system will not use the location tracking for tracking the employee, and will not consume the resources, such as the battery charge, for that purpose.

If, on the other hand, a trip is scheduled for the period (decision block 402: Yes), in block 406 the ETA estimator estimates a value of ETA. In some embodiments, the ETA estimator estimates the ETA based on information that include one or more of a distance from the target POIs, the average or instant velocity of the mobile device, the context, and the rules.

In decision block 408, the system checks whether the ETA is greater than a threshold time. If the ETA is greater than the threshold time (decision block 408: Yes), the system enters the conserve mode in block 410. If, on the other hand, the ETA is not greater than the threshold time (decision block 408: No), the system enters the active mode in block 412. In some embodiments, in the conserve mode the system turns off one or more of the tracking mechanisms, such as the fine grained tracking, to conserve resources such as the battery charge. In some embodiments, in the active mode the system continues using the tracking system, thus consuming the needed resources such as the battery charge.

In some embodiments, the threshold time is chosen such that for shorter time periods, turning fine grained tracking off and on will not provide a considerable resource conservation. In some embodiments, the threshold time is determined by comparing the energy used for the turning off and the subsequent turning on with the tracking that is saved by turning the tracking off during the time interval.

In some embodiments, the threshold time is stored as a static value. In some embodiments, the threshold time has a dynamic value that changes based on other factors. For example, in some embodiments, the threshold time is a function of the remaining resource amount (e.g., the remaining battery charge), the total approximate time left for completion of all trips or before the next recharge time, the distance to the next POI, etc. In some embodiments, the system attempts to conserve resources more aggressively if the resource level is low or if the amount of time left until the next recharge time or the completion of the trip is long. In such a case, the system lowers the threshold time, thus increasing the possibility that the system enters the conserve mode. Conversely, the system attempts to conserve resources less aggressively if the resource level is high or if the amount of time left until the next recharge time or the completion of the trip is short. In such a case, the system raises the threshold time, thus reducing the possibility that the system enters the conserve mode.

In some embodiments, when switching to the conserve mode, in block 410, the system determines a reassess time. The reassess time is a time interval after which the system reassesses whether to switch to the active mode. In some embodiments, the reassess time is measured as a fraction, such as half or two thirds, of the ETA. In some embodiments, the reassess time, or its ratio to the ETA, decreases as the mobile device approaches the destination POI or POI cluster.

In some embodiments, the process of FIG. 4 is performed by the mobile device. In some embodiments, one or more of the steps in the process are performed by the analyzer module. In some embodiments, the analyzer module performs the process in collaboration with various other modules, including the ETA estimator module.

In some embodiments, the tracking system performs the process of FIG. 4 once at the start of a time period or at the start of the first use of the tracking system. In some embodiments, the time period is a day. Thus, in some embodiments, the tracking system perform the process of FIG. 4 once every work day, or at the start of its operation each day, or at the start of the first trip by the employee on each day. In other embodiments, the period is longer or shorter than a day, for example, a week, a month, or a few hours. In some embodiments, the tracking system also performs the process of FIG. 4 when it is turned on or when it wakes up from hibernation. In some embodiments, the tracking system is turned on or wakes up from hibernation at a specific time, e.g., the start time in each period, or the start of the first trip in each period. In some embodiments, the tracking system wakes up from hibernation due to a wakeup command from the mobile device or from the server. In some embodiments, the server or the mobile device issues a wakeup command due to a change of status of the mobile device, a change of schedule of the employee, or a direct input from the user.

Figure 5:
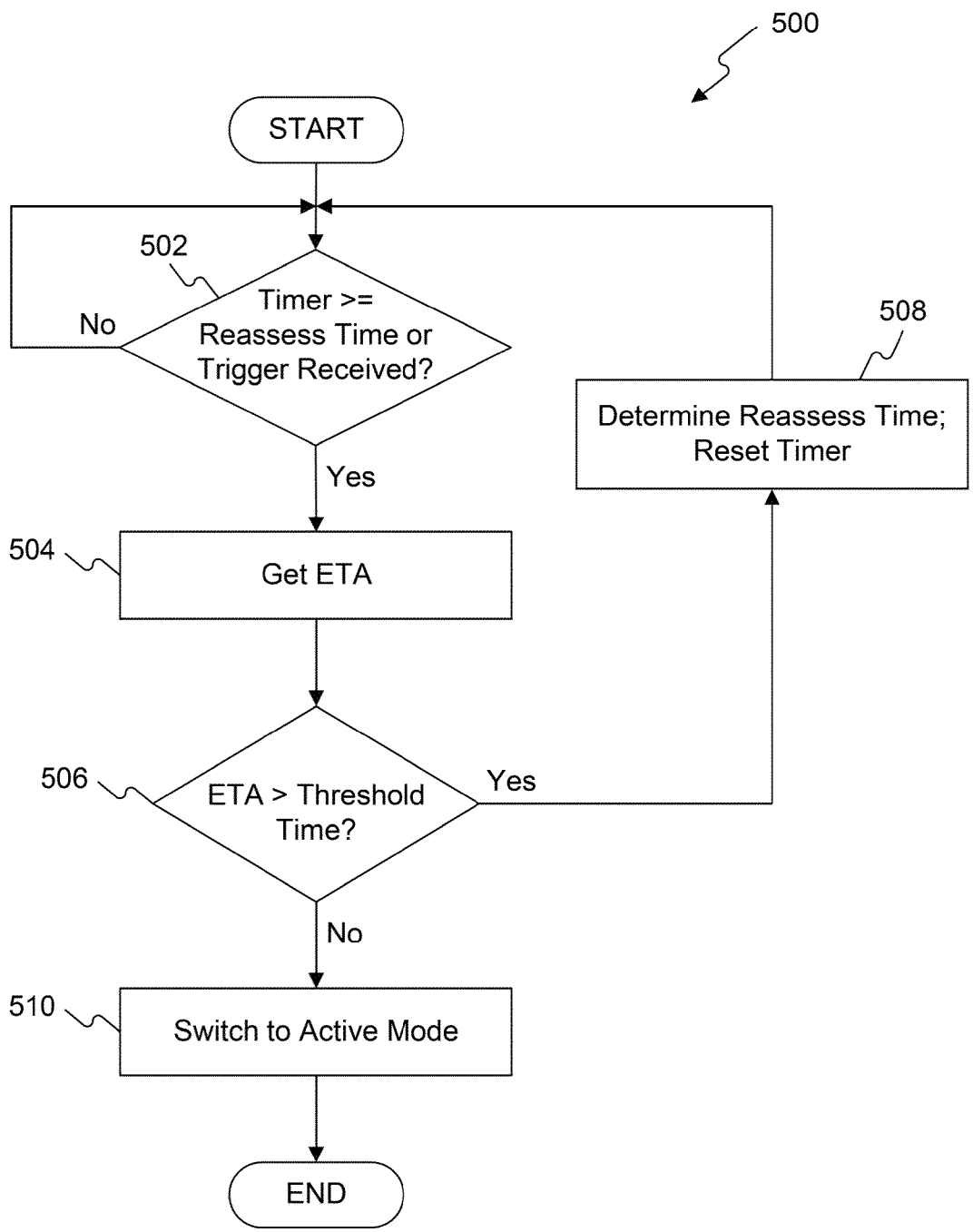
FIG. 5 shows a flowchart for the processes performed by a tracking system in a conserve mode according to some embodiments.

FIG. 5 shows a flowchart 500 for a process in the conserve mode performed by the tracking system according to some embodiments. In the conserve mode, the tracking system regularly reassesses whether to exit the conserve mode. In particular, in decision block 502, the tracking system determines whether to reassess the ETA.

In some embodiments, in decision block 502, the tracking system determines to reassess the ETA if an elapsed time has reached or exceeded the reassess time. In some embodiments, the elapsed time is a time elapsed since the last time that the reassess time was updated. The elapsed time is measured by the timer module.

In some embodiments, in decision block 502, the system alternatively determines to reassess the ETA if a trigger to reassess has been received. In some embodiments, a trigger to reassess is issued by the user to reassess the ETA. In some embodiments, a trigger to reassess is issued by the server to check the location of the employer or to reassess the ETA. In some embodiments, a trigger to reassess is issued when the mobile device approaches a cell tower and thus a coarse grained tracking system becomes available. In some embodiments, a trigger to reassess is issued by a sensor. A sensor may issue a trigger to reassess, for example, if the sensor detects a change of status in the mobile device. In some embodiments a change of status includes a substantial change in the average speed, a change in the traffic speed on the road, the change of weather, a change of route, reaching a specific clock time, etc. In some embodiments, the tracking system determines whether to reassess the ETA solely based on the elapsed time, solely based on receiving a trigger to reassess, or based on either condition.

In some embodiments, the tracking system regularly performs decision block 502. In some embodiments, the tracking system performs decision block 502 with a frequency, such as once every one, five, ten, or fifteen minutes. As long as the tracking system determines not to reassess the ETA (decision block 502: No), the tracking system continues to loop back to decision block 502. In some embodiments, the frequency is dynamic and depends on, for example, the distance to the next POI or the value of reassess time. In some embodiments, the frequency increases as the mobile device approaches the next POI. In some embodiments, the interval between performance of decision block 502 is a fraction of the reassess time. As a result, the frequency increases as the reassess time decreases.

If the tracking system determines to reassess the ETA (decision block 502: Yes), at block 504 the system determines the value of ETA. The value of ETA is an updated value of ETA based on the present state of the mobile device. In some embodiments, the present state of the mobile device depends on one or more of the distance from the next cluster, the speed, the conditions of the road, the weather, or the traffic. In some embodiments, the state of the mobile device also depends on other indicators determined by the sensor module or by the server.

In decision block 506, the updated ETA is compared to the threshold time. The threshold time in the conserve mode is the same or different from the threshold time used in the startup mode. In some embodiments, the threshold time is a dynamic threshold time.

If the ETA is greater than the threshold time (decision block 506: Yes), the system recalculates the reassess time (step 508), resets the timer to measure the elapsed time, and returns to decision block 502. In some embodiments, the reassess time is a function of the updated ETA. If, on the other hand, the ETA is not greater than the threshold time (decision block 506: No), the system switches to the active mode (step 510).

In some embodiments, instead of, or in addition to, comparing the ETA with the threshold time, the tracking system also makes a decision based on a distance to the next POI or the next cluster of POIs. In some embodiments, the tracking system switches to the active mode if the distance is less than a threshold distance.

In some embodiments, all or some of the steps in the process of FIG. 5 are performed by the mobile device. In some embodiments, one or more of the steps in the process are performed by the analyzer module. In some embodiments, the analyzer modules performs the process of FIG. 5 in collaboration with various other modules, including the ETA estimator module, the timer module, or the sensor module.

Figure 6:
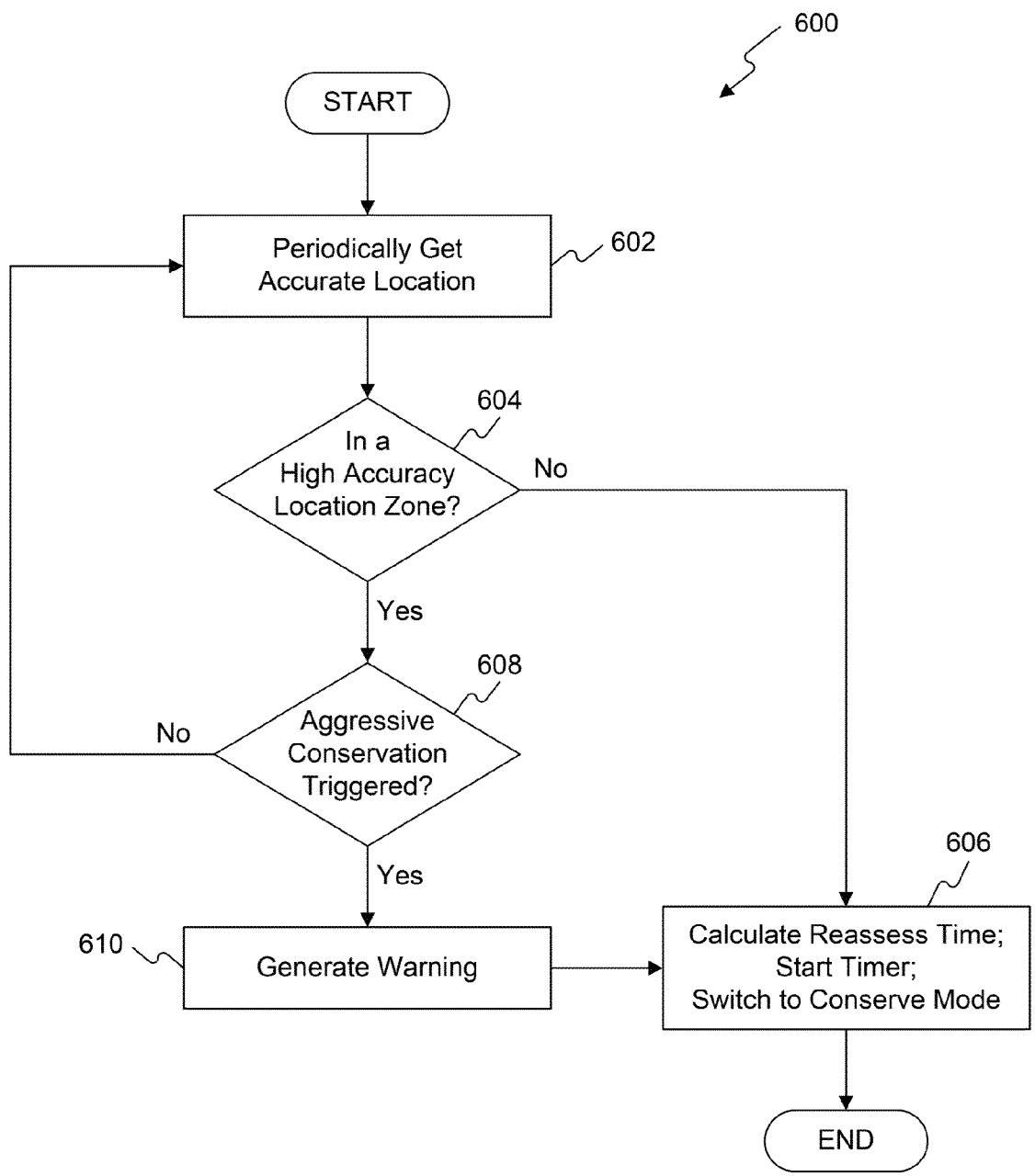
FIG. 6 shows a flowchart for the processes performed by a tracking system in an active mode according to some embodiments.

FIG. 6 shows a flowchart 600 for a process in the active mode performed by the tracking system according to some embodiments. In the active mode, and as shown in block 602, the tracking system periodically determines the location of the mobile device using a fine grained location tracker. In some embodiments, the mobile device uses a GPS system for accurate location tracking. In some embodiments, the mobile device regularly reports the accurately determined location to the server. In some embodiments, the accurate tracking consumes various resources of the mobile device, such as its battery charge.

To minimize the resource usage, the tracking system also regularly checks whether the fine grained tracking is necessary. In decision block 604, the tracking system checks whether the mobile device is in or near a high accuracy location zone. A high accuracy location zone includes a POI cluster area, an area near a POI or a POI cluster, etc. A high accuracy location zone is determined based on the distance from the nearest POI or POI cluster. In some embodiments, the tracking system continues to accurately track the location of the mobile device while in a high accuracy location zone, but switches to the conserve mode if the mobile device is outside a high accuracy location zone. A mobile device may move outside a high accuracy location zone by, for example, leaving a POI or a POI cluster.

If the mobile device is not in a high accuracy location zone (decision block 604: No), the tracking system calculates a reassess time, restarts the timer, and switches to the conserve mode (step 606). The tracking system calculates the reassess time based on a distance to the nearest POI or POI cluster. In some embodiments, to calculate the reassess time, the tracking system recalculates the ETA and based on that determines the reassess time.

In some embodiments, even while in a high accuracy location zone, the tracking system may determine that an aggressive resource conservation is necessary and switch to the conserve mode. The aggressive resource conservation is triggered by a low resource indication, such as an indication that one or more resources, such as the battery charge, have dropped below a threshold resource level. In some embodiments, a threshold resource level is determined by an amount below which the resource only suffices for performing the device's necessary non-tracking operations, such as communication. In some embodiments, an aggressive resource conservation is triggered if the duration of staying in the active mode exceeds a maximum active time limit. In some embodiments, an aggressive resource conservation is triggered if the duration of staying in the high accuracy location zone exceeds a maximum time level.

In decision block 608, the tracking system determines whether aggressive conservation is triggered. If the aggressive conservation is not triggered (decision block 608: No), flowchart 600 loops back to block 602 to periodically receive accurate location information. If, on the other hand, the aggressive conservation is triggered (decision block 608: Yes), the tracking system generates a warning indicating that aggressive conservation has been triggered (step 610). In some embodiments, the warning is issued to the employee on the mobile device. In some embodiments, the warning is issued to the employer through the server. In some embodiments, the warning indicates that, although the mobile device is in a high accuracy location zone, the mobile device is switching to the conserve mode and thus stopping accurate location tracking. Upon generating the warning, the tracking system calculates reassess time, restarts a timer, and switches to conserve mode (step 606).

In some embodiments, while in the conserve mode, the tracking system periodically wakes up to reassess the ETA or the wake up time. Further, the tracking system switches to an active mode to use a fine grained tracking when the employee reaches near or in a POI cluster zone.

In some embodiments, all or some of the steps in the process of FIG. 6 are performed by the mobile device. In some embodiments, one or more of the steps in the process are performed by the analyzer module. In some embodiments, the analyzer modules performs the process of FIG. 6 in collaboration with various other modules, including the ETA estimator module, the timer module, or the sensor module.

Figure 7:
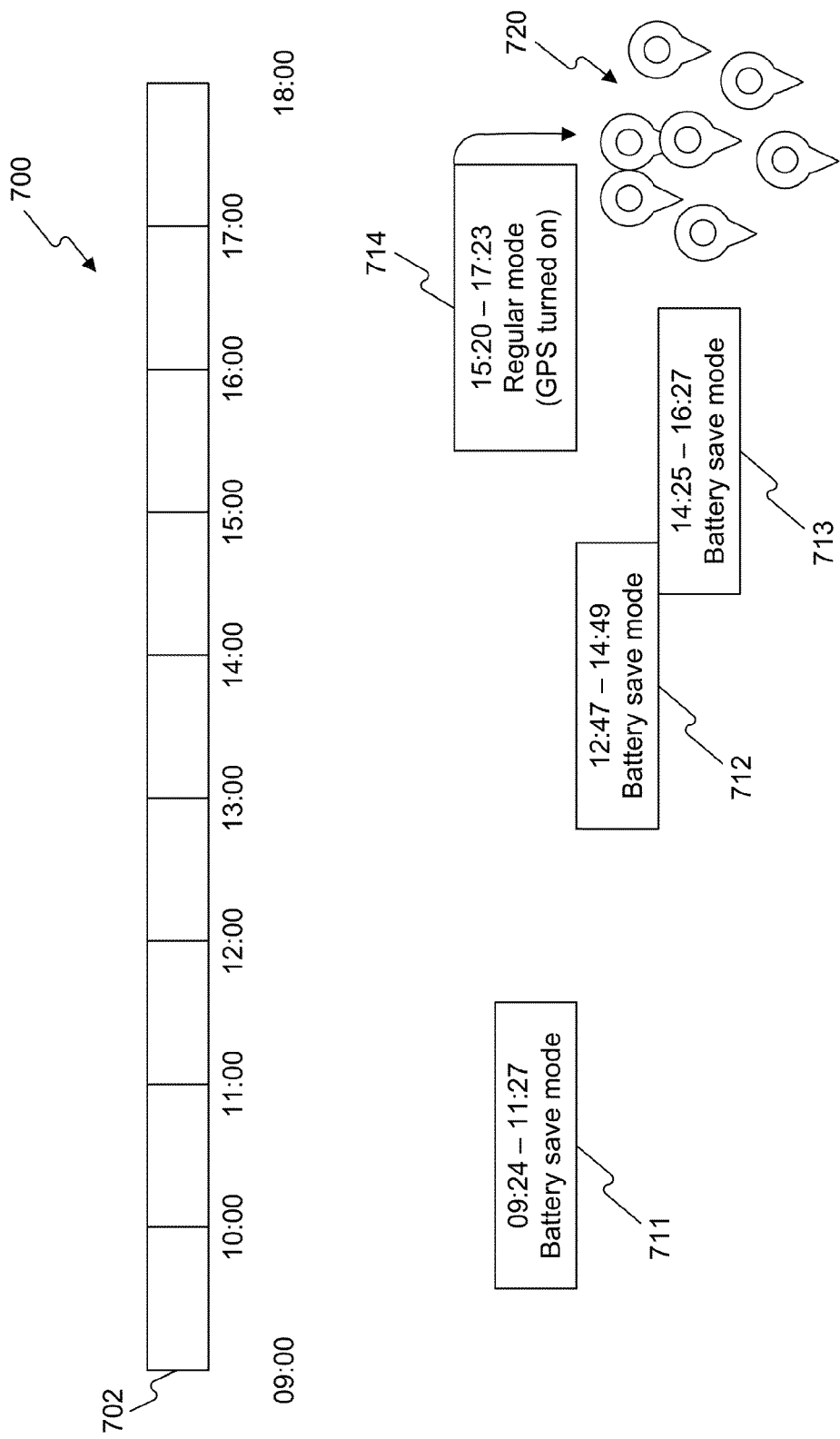
FIG. 7 shows a schematic of a time line for the activities of a tracking system according to some embodiments.

FIG. 7 shows a schematic 700 of a time line for the activities of a tracking system according to some embodiments. Schematic 700 shows a timeline 702 that includes a plurality of activity subintervals 711-714 according to an embodiment. Timeline 702 starts at 09:00, when the employee's workday starts, and ends at 18:00, when the workday ends. Moreover, activity subintervals 711-714 depict consecutive subintervals during the workday, in which the tracking system regularly recalculates an ETA or a reassess time, and determines whether to use conserve mode or active mode. Further, schematic 700 shows a POI cluster 720, which the employer has assigned for the employee's visit in that day.

At the start of subinterval 711, at 09:24, the tracking system executes the startup mode, and calculates the ETA or the reassess time, or both. The tracking system then enters a conserve mode, in this case a battery save mode. In various embodiments, the conserve mode may include conserving other resources such as communication bands or wireless usage time. During subinterval 711, while in the battery save mode, the tracking system does not use the fine grade tracking, in this case a GPS system, which consumes a high amount of battery charge. Further, at 11:22, during subinterval 711, the tracking system receives a trigger to reassess from a sensor module. Upon reassessing, the system updates the reassess time and continues in the battery save mode.

At the end of subinterval 711, at 12:47, the system wakes up, gets ETA, and determines a new reassess time. Accordingly, the tracking system determines that it does not have to switch to active mode and continues the battery save mode in subinterval 712.

Similarly, at the end of subinterval 712, at 14:25, the system wakes up, gets ETA, and determines a new reassess time. Accordingly, the tracking system determines that it still does not have to switch to the active mode and continues the battery save mode in subinterval 713.

At the end of subinterval 713 at 15:11, on the other hand, the tracking system reassesses the situation and determines that it should switch to active mode. The tracking system may make the decision because the updated ETA is below a threshold time or because a distance to POI cluster 720 is less than a threshold distance.

Thus, during subinterval 714, the tracking system remains in the active mode, and regularly tracks the location using the GPS system. During this subinterval, the employee arrives at POI cluster 720 and performs the assigned tasks.

As shown in schematic 700, in some embodiments the period for using the conserve mode is divided in two or more subintervals, such as subintervals 711-713. At the end of each subinterval, the tracking system wakes up and reassesses whether to switch to the active mode. Moreover, as the employee approaches the destination POI cluster, the duration of the subinterval decreases.

When reassessing the situation in the conserve mode, the tracking system needs to obtain the location of the mobile device. In some embodiments, the tracking system uses the location to estimate the distance to the next POI cluster. In some embodiments, the tracking system uses the distance to determine the ETA or to compare the distance with a threshold distance. In some embodiments, in the conserve mode, the tracking system obtains the location of the mobile device by mainly using a coarse grained tracking. Further, in some embodiments, if a coarse grained tracking is not available, the system uses a fine grained tracking.

Sample code (1) shows an exemplary high level code for obtaining the location of the mobile device in the conserve mode, according to some embodiments.

```
If (connectivity == exists )
{
    If ( accuracy_obtained_from_celltower == good)
        Use Cell Tower Location
    else
    {
        If (AGPS == exists)
            Obtain and Use Location using AGPS
        else
            Obtain and Use Location using GPS
    }
}
else
    Obtain and Use Location using GPS
```
(1)

In line 1, the system checks whether the mobile device is connected to a wireless communication system through a cell tower. If the mobile device is not connected, in line 14, the system obtains the location using a fine grained GPS system.

Otherwise, if the mobile device is connected to a cell tower, in line 3 the system checks whether the cell tower can provide a location of the mobile device with an acceptable accuracy. If so, the system obtains the location from the cell tower (line 4).

If the cell tower cannot provide the location with an acceptable accuracy, in line 7 the system checks whether an AGPS is available. If an AGPS is available, in line 8 the system uses AGPS to obtain the location. Otherwise, if an AGPS is not available, in line 10 the system uses the fine grained GPS system to obtain the location.

In some embodiments, while in the conserve mode, the system uses various tracking systems in a reverse order of their resource consumption. For example, in the embodiment related to sample code (1), the resource consumption for the cell tower communication is less than that of the AGPS, and the resource consumption of the AGPS is less than that of the GPS. Alternatively, in some embodiments, the system first tries using a tracking system that is regularly available before switching to a tracking system than can be turned on and off. For example, in some embodiments, the system tries the cell tower tracking first, because the mobile device tries to stay connected to the wireless network. The system switches to using the GPS tracking only after determining that the mobile device is not connected to the wireless networks or determining that the cell tower tracking is not accurate enough.

In some embodiments, the tracking system uses the context of the use and various rules to determine the ETA or various thresholds. In some embodiments, the context includes the time of the day, the speed limit on the road, the mode of transportation, the season, e.g., the rainy season, the weather conditions, prior history of the employee, prior experience of same or other employees on the same route to the same POI, the employee's identification or age, the employee's current schedule, the employee's travel pattern and prior itinerary such as average speed or stopping habits along the route, etc.

In some embodiments, rules indicate how to adjust the calculation of the ETA, the reassess time, various thresholds, or triggering aggressive conservation, based on one or more of the information in the context. In some embodiments, for example, the rules indicate that the ETA shall be increased by a specific amount if the weather condition turns to rainy or if the speed limit on the road reduces. Similarly, in some embodiments, rules indicate that the ETA shall be decreased if recent travels by the same or other employees show that reaching the POI has often taken less than the estimated ETA. In some embodiments, the context or rules are read from a database that is stored in the mobile device or in an external storage. In some embodiments, one or more of the context information is determined by a sensor, by the work log of the employee, or by a log of other employees.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not described in the embodiments. Accordingly, the invention is not limited to the above-described embodiments, but instead is defined by the appended claims in light of their full scope of equivalents.

The invention claimed is:

1. A method comprising:
    determining, by an analyzer module operating in a conserve mode, whether to assess an estimated time to arrive (ETA), of a mobile device, at a point of interest (POI), the analyzer module being implemented at least partially in hardware,
    the mobile device being tracked with respect to the POI using a mobile location tracker,
    the mobile location tracker being turned off in the conserve mode; and
    performing, by the analyzer module operating in the conserve mode, an ETA assess operation when the analyzer module determines to assess the ETA,
    performing the ETA assess operation comprising:
        determining, by the analyzer module, whether a timer measurement is greater than or equal to a reassess time,
            the timer measurement measuring a time elapsed since a last ETA assess operation or a last switch to the conserve mode,
            the reassess time indicating a time interval alter which the analyzer module reassesses whether to switch to an active mode,
            the reassess time being calculated based on the ETA, a speed of the mobile location tracker, a distance between the mobile location tracker and the POI, a prior history, or a context,
            the mobile location tracker being turned on in the active mode,
        receiving, by the analyzer module, the ETA when the timer measurement is greater than or equal to the reassess time, and
        when the ETA is not greater than a threshold time, switching from the conserve mode to the active mode.

2. The method of claim 1, further comprising:
    storing, by the analyzer module operating in the conserve mode, the reassess time; and
    determining, by the analyzer module, to assess the ETA when the timer measurement is not less than the stored reassess time.

3. The method of claim 1, wherein, when the ETA is greater than the threshold time, the method further comprises:
    recalculating, by the analyzer module operating in the conserve mode, the reassess time;
    restarting the timer measurement; and
    setting the mobile location tracker to remain in the conserve mode.

4. The method of claim 1, wherein the reassess time is a fraction of the ETA.

5. The method of claim 1, further comprising:
    receiving, by the analyzer module operating in Hall the conserve mode, a trigger; and
    where performing the ETA assess operation includes performing the ETA assess operation upon receiving the trigger.

6. The method of claim 5, wherein the trigger indicates a change of status of the mobile location tracker, and
    wherein the trigger is transmitted by a sensor module including an accelerometer, a speedometer, a clock, or a proximity sensor.

7. The method of claim 1, further comprising:
    when the ETA is greater than the threshold time, setting the mobile location tracker to remain in the conserve mode.

8. The method of claim 1, further comprising:
    determining, by the mobile location tracker operating in the active mode, a location of the mobile location tracker; and
    when the location is outside an active zone, switching from the active mode to the conserve mode.

9. The method of claim 8, further comprising:
    checking, by the analyzer module, whether an aggressive conservation trigger is received;
    when the aggressive conservation trigger is received:
        issuing a warning indicating that the aggressive conservation trigger is received, and
        switching to the conserve mode.

10. The method of claim 1, further comprising:
    determining, by the analyzer module operating in a startup mode, whether the mobile location tracker will be utilized during a period of time;
    when the mobile location tracker will not be utilized during the period of time, setting the mobile location tracker to hibernate during the period of time;
    when the mobile location tracker will be utilized during the period of time, receiving, by the analyzer module, the ETA;
    when the ETA is greater than the threshold time, switching to the conserve mode; and
    when the ETA is not greater than the threshold time, switching to the active mode.

11. The method of claim 1, wherein the ETA is calculated by an ETA module based on flail the speed of the mobile location tracker, flail the distance between the mobile location tracker and the POI, a route to the POI, the prior history, or the context.

12. A system comprising:
    an analyzer module, operating in a conserve mode, configured to:
        determine whether to assess an estimated time to arrive (ETA), of a mobile device, at a point of interest (POI), the analyzer module being implemented at least partially in hardware,
        a mobile location tracker, tracking the location of the mobile device, being turned off; and
        perform an ETA assess operation when the ETA is to be assessed,
            when performing the ETA assess operation, the analyzer module is to:
                determine whether a timer measurement is greater than or equal to a reassess time,
                    the timer measurement measuring a time elapsed since a last ETA assess operation or a last switch to the conserve mode, the reassess time indicating a time interval after which the analyzer module reassesses whether to switch to an active mode,
the reassess time being determined based on the ETA, a speed of the mobile location tracker, a distance between the mobile location tracker and the POI, a prior history, or a context,
the mobile location tracker being turned on in the active mode,
receive, from an ETA estimator, the ETA when the timer measurement is greater than or equal to the reassess time, and
when the ETA is not greater than a threshold time, switch from the conserve mode to the active mode.

13. The system of claim 12, wherein the analyzer module is further configured to:
store the reassess time.

14. The system of claim 13, wherein the analyzer module is configured to calculate the reassess time based on the ETA, flail the speed of the mobile location tracker, Hall the distance between the mobile location tracker and the POI, flail the prior history, or Hail the context.

15. The system of claim 12, wherein the system further comprises a sensor module configured to transmit a trigger indicating a change of status of the mobile location tracker, and
wherein the analyzer module is configured to:
receive the trigger, and
wherein, when performing the ETA assess operation, the analyzer module is to perform the ETA assess operation upon receiving the trigger.

16. The system of claim 15, wherein the sensor module includes an accelerometer, a speedometer, a clock, or a proximity sensor.

17. A non-transitory computer readable medium storing instructions, the instructions comprising:
one or more instructions which, when executed by one or more processors operating in a conserve mode, cause the one or more processors to:
determine whether to assess an estimated time to arrive (ETA), for a mobile device, at a point of interest (POI),
the mobile device being tracked, with respect to the POI, using a mobile location tracker,
the mobile location tracker being turned off in the conserve mode;
perform an ETA assess operation when the ETA is to be assessed,
the one or more instructions to perform the ETA assess operation comprising one or more instructions to:
determine whether a timer measurement is greater than or equal to a reassess time,
the timer measurement measuring a time elapsed since a last ETA assess operation or a last switch to the conserve mode,
the reassess time indicating a time interval after which the one or more processors reassess whether to switch to an active mode,
the reassess time being based on the ETA, a speed of the mobile location tracker, a distance between the mobile location tracker and the POI, a prior history, or a context,
the mobile location tracker being turned on in the active mode,
receive the ETA when the timer measurement is greater than or equal to the reassess time, and
when the ETA is not greater than a threshold time, switch from the conserve mode to the active mode.

18. The non-transitory computer readable medium of claim 17, wherein the instructions further comprise one or more instructions to:
store the reassess time; and
determine to assess the ETA when the timer measurement is not less than the stored reassess time.

19. The non-transitory computer readable medium of claim 17, wherein the instructions further comprise:
one or more instructions to receive a trigger, and
wherein the one or more instructions to perform the ETA assess operation include one or more instructions to perform the ETA assess operation upon receiving the trigger.

20. The non-transitory computer readable medium of claim 17, wherein the instructions further comprise:
one or more instructions to check whether an aggressive conservation trigger is received;
one or more instructions to issue a warning indicating that the aggressive conservation trigger is received when the aggressive conservation trigger is received; and
one or more instructions to switch to the conserve mode.

* * * * *